Figure 1:
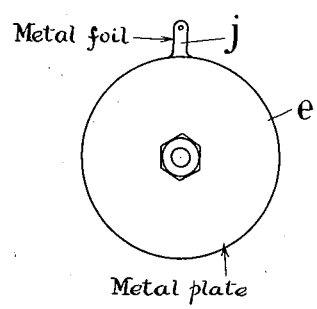

Jan. 14, 1930.  E. PRESSER  1,743,160

METHOD OF MANUFACTURING ALTERNATING CURRENT RECTIFIERS

Filed Dec. 26, 1928

E. Presser
INVENTOR

By: Marks & Clerk
Attys.

Patented Jan. 14, 1930

1,743,160

UNITED STATES PATENT OFFICE

ERNST PRESSER, OF NUREMBERG, GERMANY, ASSIGNOR TO SÜDDEUTSCHE TELEFON-APPARATE, KABEL- UND DRAHTWERKE AKTIENGESELLSCHAFT, OF NUREMBERG, GERMANY

METHOD OF MANUFACTURING ALTERNATING-CURRENT RECTIFIERS

Application filed December 26, 1928, Serial No. 328,612, and in Germany December 10, 1927.

Alternating current rectifiers are known in which a layer of selenium or selenium compounds is placed between two plate-like metal electrodes, the said layer of selenium or selenium compounds being intimately connected with the one electrode whilst it is only pressed on to the other electrode.

The object of the present invention is to provide a method which will produce an intimate connection between the surface of a metal electrode and the intermediate layer of selenium or selenium compounds.

It is to be borne in mind that selenium, like tin for instance, can occur as a metal as well as a metalloid. As a metalloid in an amorphous state it is very similar to sulphur. As regards its metal form, it occurs in various modifications which are usually intermixed. In its metallic state it has a silvery appearance; it can be filed and, under certain circumstances, it can be worked on a lathe without crumbling.

In order to convert the selenium into a state suitable for the present purpose, according to the present invention the selenium, after it has been intimately connected with one electrode, for instance by fusing, and has thereby passed into the amorphous metallic state—in so far as it has not been converted into this state at the beginning of the fusing—is subjected at the termination of the fusing operation, together with the electrode connected therewith, to a temperature lying between 80° C. and the melting point of the selenium. The selenium thereby slowly passes into the metallic state without the intimate connection between the electrode and selenium being removed. The electrode with the selenium is then cooled down to ordinary temperature and the second electrode is then placed on to the layer of selenium and pressed thereon in such a manner that a surface contact is produced.

The heating operation may last a few minutes or hours or even days. This depends upon the purity of the selenium, upon the nature of any possible admixtures, upon the value of the electric resistance which it is desired to obtain, etc.

It has been found that an especially good rectifying effect is produced if, during the heating operation, a temperature of at least 173° C. is reached. Preferably the heating is effected to approximately the melting point of selenium, which lies between 215 and 220° C. It is to be borne in mind that the melting temperature to a certain extent depends upon the purity of the selenium.

The same heating operation is employed when the intimate connection between the selenium and the surface of the electrode has been produced in another manner than by fusing, for instance by electrolytic deposition of the selenium on the electrode or by electrolytic deposition of the material of the electrode on a selenium plate.

In the case of certain metals used for the electrode with which the selenium is intimately connected, it may occur that during the heating operation the selenium becomes detached from the electrode. In order to avoid this according to a further modification of the invention, the electrode is roughened before it is united with the selenium. This may be produced by the electrode being formed with fine grooves obtained by scratching thereon with a steel point or by rubbing it with rough emery or by means of a jet of sand, etc.

It has been found that it is a great advantage to heat first of all at a comparatively low temperature, for instance 120° C., until the amorphous selenium has been converted into the crystalline state and only thereupon to heat to a higher temperature, for instance 200° C.

At a comparatively low temperature, the conversion of the amorphous selenium into the crystalline state takes place much more slowly than at a higher temperature. Whilst the conversion at a high temperature, of for instance 210° C., takes place in a few minutes, the conversion at a lower temperature, of for instance 100° C., may require several hours.

The crystalline selenium produced slowly at a low temperature has a more favourable structure and surface than the selenium which has been quickly crystallized. This more favourable structure is noticeable also during the subsequent heating at a high temperature. The latter heating to a temperature of more than 175° C. is necessary in order to obtain great conductivity in the direction in which the current passes through the valve. However, if this heating is preceded by heating at a lower temperature, the difference in the electric resistance when the current passes in one direction and, when the valve is closed, in the other direction, is substantially increased.

It has further been ascertained that the conductivity in the direction in which the valve is open can be substantially increased in the case of valves of the kind referred to by subjecting the layer of selenium provided on the electrode to pressure during the heating operation. In this way the load admissible per unit surface is increased and consequently for a given output the dimensions of the valve are reduced. In addition thereto the valve action itself is improved.

It is especially advantageous to exert the pressure upon the layer of selenium only until the amorphous selenium has been converted into the crystalline state, irrespective of the duration of the heating beyond this point effected for other reasons.

One preferred mode of carrying the invention into effect is as follows:—

Upon the layer of selenium which is fused with its back on to a metal electrode, there is placed a thin disc or plate of a material which does not adhere to the selenium when the latter is heated. Mica, glass, hardened steel, nickel, etc., may for instance be used as a suitable material for this purpose. On the said plate there is placed a layer of soft or elastic material, for instance rubber or felt and on the latter a thicker metal plate. The whole is then pressed together by means of a screw or other suitable device. The soft intermediate layer has the advantage that the pressure exerted upon the layer of selenium is uniformly distributed on the same. The pressure may, for instance, be 30 kgms. per sq. cm.

Apparently owing to the pressure exerted upon the selenium during the conversion into the crystalline state, the structure of the mass of selenium is made closer, whereby its electric conductivity is increased.

The use of pressure on the selenium layer has however, a further advantage that the thickness of the layer is more equalized along the individual points of the surface. This is due to the fact that, owing to the simultaneous heating of the selenium, the latter is slightly softened and consequently it can be pressed down by means of a flat plate, whereby any existing differences in the thickness of the layer are equalized at the individual points thereof. This result is also obtained when use is made of soft or elastic intermediate layers, since also in that case any projecting points of the layer of selenium receive a higher pressure, whereby a certain equalization is produced in the thickness of the layer.

Another mode of carrying the invention into effect consists in this that during the application of the pressure, the plate inserted between the layer of selenium and the soft or elastic intermediate layer has a thickness of less than 0.1 mm. In this way it is ensured that the layer of selenium, even when it is not quite flat, is subjected at all points of its surface to pressure, since such a thin plate is pressed into all the cavities of the layer of selenium by the soft intermediate layer which is pressed thereon. In addition thereto the formation of air bubbles between the layer of selenium and the plate which is pressed thereon, which bubbles may cause great irregularities in the thickness of the layer of selenium is prevented since the pressed-on plate abuts, even before the conversion of the heat, also against all the deeper lying points of the selenium layer which is still solid, whereby all the air between the layer of selenium and the pressed-on plate is removed.

When the heating is divided into two stages, the first heating stage being effected at a comparatively low temperature of, for instance, 100° C., and the second heating stage at a higher temperature of, for instance, 200° C., it is sufficient if the layer of selenium is subjected to pressure during the first heating stage during which the conversion of the amorphous selenium into the crystalline state takes place. This is of special importance in view of the fact that most of the materials used for the soft intermediate layers, as for instance rubber, during the application of pressure cannot stand a high temperature.

It is entirely immaterial for the essence of the invention whether the layer of selenium is made of pure selenium or of selenium with admixtures which may be used for the purpose of increasing the efficiency of the selenium.

Figure 2:
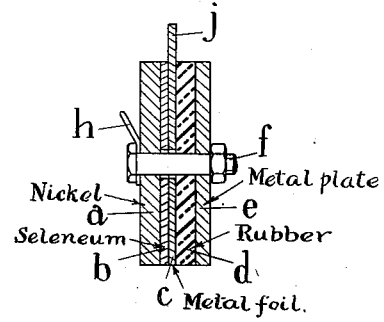
Figure 3:
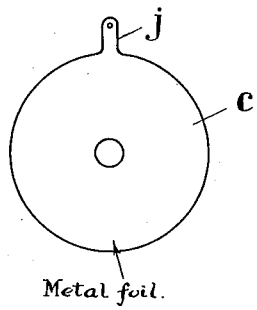

One form of carrying the invention into effect is illustrated, by way of example, in the accompanying drawings, Figure 1 showing a side elevation and Figure 2 being a sectional elevation of the improved rectifier, while Figure 3 illustrates for the sake of clearness a plan view of the metal foil employed.

$a$ is a nickel plate with which a layer $b$ of selenium is intimately connected by the fusing of the selenium on the nickel. A metal foil $c$ provided with a projection $j$ serving as an electric terminal abuts against the layer of selenium. $h$ is the other terminal of the rectifier, which is connected with the nickel plate $a$. $d$ is a rubber plate which is pressed by means of the metal plate $e$ and screw $f$ against the metal foil $c$, so that the latter shall make good contact with the surface of the selenium layer at all points.

What I claim is:—

1. A method of manufacturing alternating current rectifiers comprising a layer of selenium placed between two electrodes consisting in first producing an intimate union between the selenium and an electrode and then heating them together to a temperature lying between 80° C. and the melting point of selenium.

2. A method of manufacturing alternating current rectifiers comprising a layer of selenium placed between two electrodes, consisting in first producing an intimate union between the selenium and an electrode and then heating them together to a temperature of at least 175° C.

3. A method of manufacturing alternating current rectifiers comprising a layer of selenium placed between two electrodes, consisting in first roughening the one electrode then intimately uniting it with the selenium and, after they have been united, heating them to a temperature lying between 80° C. and the melting point of selenium.

4. A method of manufacturing alternating current rectifiers comprising a layer of selenium placed between two electrodes, consisting in first roughening the one electrode then intimately uniting it with the selenium and, after they have been united, heating them to a temperature of at least 175° C.

5. A method of manufacturing alternating current rectifiers comprising a layer of selenium placed between two electrodes, consisting in first producing an intimate union between the selenium and an electrode and thereupon heating them together first of all at a lower temperature until the amorphous selenium is converted into the crystalline state and then to a higher temperature.

6. A method of manufacturing alternating current rectifiers as claimed in claim 5, in which the first stage of the heating takes place at a temperature of less than 150° C.

7. A method of manufacturing alternating current rectifiers as claimed in claim 5, in which the second stage of the heating takes place at a temperature of more than 175° C.

8. A method of manufacturing alternating current rectifiers as claimed in claim 1 and in which the layer of selenium is subjected to pressure during the heating.

9. A method of manufacturing alterating current rectifiers as claimed in claim 1 and in which the said heating takes place in two different stages, first at a temperature of less than 150° C. and then at a higher temperature and in which the pressure is applied to the layer of selenium only during the first heating stage.

10. A method of manufacturing alternating current rectifiers as claimed in claim 1 and in which the layer of selenium is subjected to pressure during the heating, the said pressure being effected through the intermediary of a pressing member and of a soft or elastic intermediate layer placed between the layer of selenium and the said pressure member.

11. A method of manufacturing alternating current rectifiers as claimed in claim 1 and in which the layer of selenium is subjected to pressure during the heating, the said pressure being effected through the intermediary of a pressing member and of a soft or elastic intermediate layer placed between the layer of selenium and the said pressure member as well as through the intermediary of a plate, the thickness of which is less than 0.1 mm. placed between the layer of selenium and the said soft or elastic intermediate layer.

In testimony whereof I have signed my name to this specification.

ERNST PRESSER.